L. E. JENKINS.
MEASURING DEVICE FOR GASOLENE PUMPS.
APPLICATION FILED MAR. 29, 1918.

1,286,646.

Patented Dec. 3, 1918.

Witnesses

Inventor
L. E. Jenkins
By D. Swift & Co.
Attorneys

UNITED STATES PATENT OFFICE.

LEONARD E. JENKINS, OF BAYFIELD, COLORADO.

MEASURING DEVICE FOR GASOLENE-PUMPS.

1,286,646.             Specification of Letters Patent.      Patented Dec. 3, 1918.

Application filed March 29, 1918. Serial No. 225,451.

*To all whom it may concern:*

Be it known that I, LEONARD E. JENKINS, a citizen of the United States, residing at Bayfield, in the county of La Plata, State of Colorado, have invented a new and useful Measuring Device for Gasolene-Pumps; and I do hereby declare the following to be a full, clear, and exact description of the invention, such as will enable others skilled in the art to which it appertains to make and use the same.

This invention relates to an improved measuring device for use in connection with gasolene pumps of the type that are employed in garages and automobile filling stations, and an object of the invention is to provide a device of this kind, for so measuring the gasolene up to five gallons by half gallons when pumped, that the chauffeur in the car may see the exact amount that has been purchased, as well as the person who is operating the pump.

A further object of the invention is to provide a supporting cylinder carried by the outlet pipe of the pump, for supporting an inverted gasolene receptacle, for instance an open ended bottle.

A further object of the invention is the provision of means for centering the bottle or receptacle in the supporting casing or cylinder.

A further object of the invention is the provision of means for permitting air to enter the receptacle, whereby gasolene may easily flow from the receptacle when the outlet valve is open.

In practical fields the details of construction may necessitate alterations falling within the scope of what is claimed.

The invention comprises further features and combination of parts as hereinafter set forth, shown in the drawings and claimed.

In the drawings:—

Figure 1:
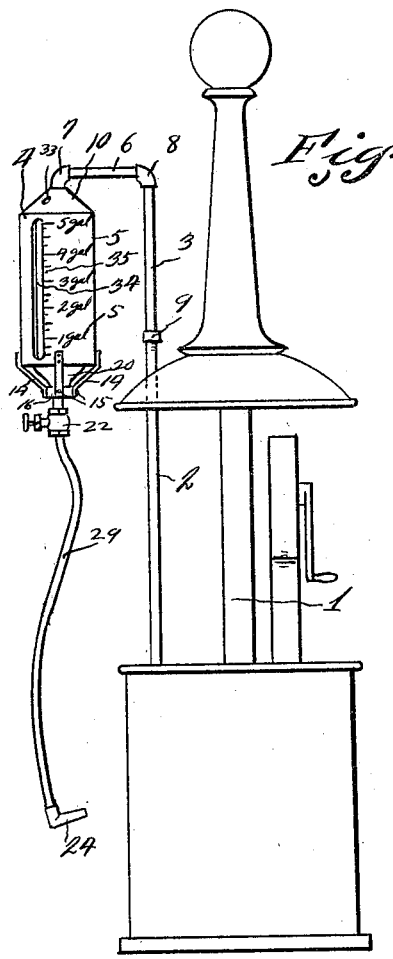
Figure 1 is a view in side elevation of a filling-station gasolene pump, showing the measuring device as applied thereto.
Figure 2:
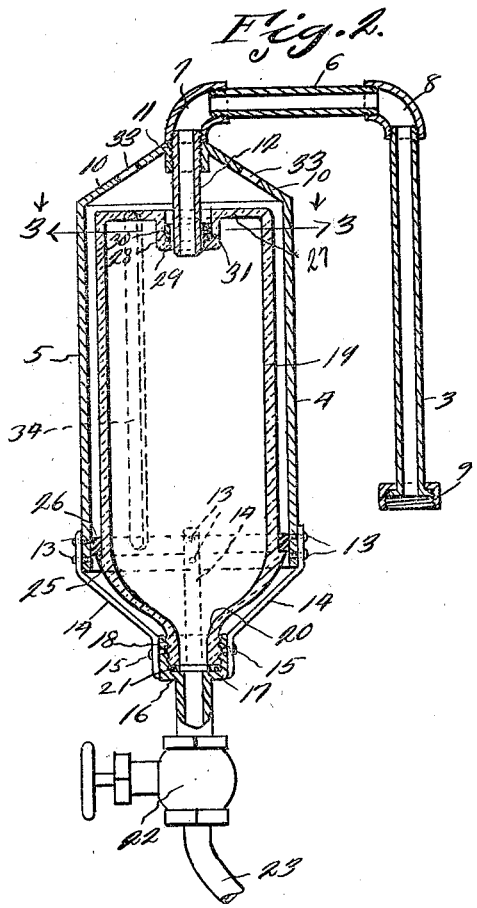
Fig. 2 is a vertical sectional view through the measuring device.
Figure 4:
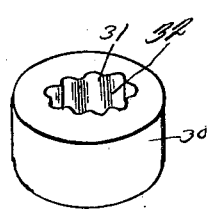
Fig. 4 is a detail perspective view of a rubber gasket through which the terminus of the outlet pipe of the pump extends at the point where the terminus enters the gasolene receptacle.
Figure 3:
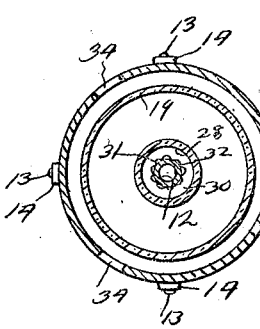
Fig. 3 is a sectional view on line 3—3 of Fig. 2.

Referring more especially to the drawings 1 designates a conventional form of gasolene pump of the kind that is employed in garages and filling stations, and 2 denotes the outlet pipe, and 4 denotes the improved measuring device. This measuring device comprises a supporting cylinder or casing 5, to which a pipe 6 is connected by means of an elbow 7. The section of pipe 6 is connected by an elbow 8 to the section of pipe 3, which is coupled at 9 to the outlet pipe 2. The casing 5 is hollow and cylindrical and has a conical upper end 10, the flanged opening 11 therein is threaded, in which the tubular section 12 is threaded. This tubular section is also threaded into the elbow 7 as shown in Fig. 2. Secured to the outer face of the lower end of the casing 5 by the rivets 13 are angular supporting arms 14, the lower ends of which are secured by rivets 15 to the tubular connector 16. The interior cylindrical wall of the enlargement 17 of the connector has threads 18. A gasolene receiving receptacle 19 is arranged in the casing 5 and the contracted neck or outlet end 20 of the receptacle 19 (which is inverted) is threaded into the enlargement 17 of said connector, there being a washer 21 in the enlargement against which the marginal edge of the outlet end engages to insure a fluid tight joint. The connector is connected to a valve 22, to which a flexible tube 23 is connected. The flexible tube has an angular outlet member 24 at its end to extend into the gasolene tank filling opening (not shown) of the automobile. Where the neck merges from the body of the receptacle 19 an annular shoulder 25 is provided. A rubber gasket 26 surrounds the receptacle 19 and is in engagement with the shoulder 25 and designed to hold the receptacle spaced centrally of the casing or cylinder 5, as shown in Fig. 2. The end wall 27 of the receptacle 19 has a countersink 28, and the bottom of this countersunk portion has an opening 29 through which the tubular section 12 extends loosely. A rubber gasket or washer 30 is arranged in the countersink, and the opening 31 (through which the tubular section extends) of the gasket has its surface provided with vertically extending corrugations 32, which are engaged by the tubular section 12, so as to hold the receptacle centered or concentric with the casing 5, and by means of the spaces between the corrugations sufficient air is allowed to enter the receptacle, whereby the displacement of the gasolene is permitted when the valve 22 is opened. The conical end of the cylinder 5 has openings 33, so that air will pass into the receptacle through the spaces between the corrugations 32. The casing or cylinder 5 is provided with vertical slots 34, through which the level of the gasolene as it enters the receptacle 19 may be easily seen by the chauffeur while sitting in the automobile. Adjacent one of the edges of each slot 34 is a scale 35 graduated in gallons from one to five, while the gallons are subdivided in quarts and half gallons. By means of this graduated scale the exact amount of gasolene as it is allowed to enter the receptacle 19, may be read by the chauffeur in the automobile, as well as by the attendant who operates the pump at the filling station. The amount of gasolene purchased is allowed to enter the receptacle, and then the valve 22 is opened, whereby the gasolene may enter the tank of the automobile.

The invention having been set forth what is claimed as new and useful is:—

1. In a measuring device for gasolene dispensing pumps, a supporting casing having a graduated scale, a pipe connected at its extremity with said casing, the lower end of the casing having a connector depending therefrom, a discharge pipe coupled to the connector and provided with a valve, a receptacle, having a lower contracted neck engaging in and supported by the connector, and a pipe of communication between the first named pipe and the upper end of the receptacle.

2. In a measuring device for gasolene dispensing pumps, a supporting casing having a graduated scale, a pipe connected at its extremity with said casing, the lower end of the casing having a connector depending therefrom, a discharge pipe coupled to the connector and provided with a valve, a receptacle having a lower contracted neck engaging in and supported by the connector, and a pipe of communication between the first named pipe and the upper end of the receptacle, and means at both ends of the receptacle for holding the receptacle supported concentrically in the casing.

3. In a measuring device for gasolene dispensing pumps, a supporting casing having a graduated scale, a pipe connected at its extremity with said casing, the lower end of the casing having a connector means comprising angularly depending arms from the casing for supporting the connector, a discharge pipe coupled to the connector and provided with a valve, a receptacle having a lower contracted neck engaging in and supported by the connector, and a pipe of communication between first named pipe and the upper end of the receptacle, means at both ends of the receptacle for holding the receptacle supported concentrically in the casing, and means adjacent the pipe of communication to permit air to enter the receptacle, the top of the casing having apertures.

In testimony whereof I have signed my name to this specification in the presence of two subscribing witnesses.

LEONARD E. JENKINS.

Witnesses:
J. E. WILLIAMS,
W. H. TINNIN.